United States Patent

Lindsey, Jr.

[11] 4,147,370
[45] Apr. 3, 1979

[54] FRONT WHEEL DRIVE FOR A BICYCLE

[76] Inventor: Ben Lindsey, Jr., Box 1256, Maljamar, N. Mex. 88264

[21] Appl. No.: 865,705

[22] Filed: Dec. 29, 1977

[51] Int. Cl.² ............................................. B62M 1/12
[52] U.S. Cl. .................................... 280/234; 280/244
[58] Field of Search ............... 280/233, 234, 244, 247; 272/72, 73

[56] References Cited

U.S. PATENT DOCUMENTS

| 498,394 | 5/1893 | Huennekens | 280/234 |
|---|---|---|---|
| 565,556 | 8/1896 | Murray | 280/234 |
| 598,026 | 1/1898 | Slippern | 280/234 |
| 613,943 | 11/1898 | Schaibly | 280/234 |
| 628,426 | 7/1899 | Woodruff | 280/234 X |
| 3,701,543 | 10/1972 | Clark | 280/234 |

FOREIGN PATENT DOCUMENTS

| 907428 | 3/1946 | France | 280/233 |
|---|---|---|---|
| 968947 | 12/1950 | France | 280/234 |
| 282046 | 6/1931 | Italy | 280/233 |
| 414067 | 6/1946 | Italy | 280/234 |
| 17835 of | 9/1894 | United Kingdom | 280/233 |
| 806 of | 1900 | United Kingdom | 280/233 |

Primary Examiner—Joseph F. Peters, Jr.
Assistant Examiner—Terrance L. Siemens
Attorney, Agent, or Firm—Marcus L. Bates

[57] ABSTRACT

A bicycle has a rear wheel assembly which is chain driven by the usual foot cranked sprocket. A front wheel assembly is also chain driven by a drive sprocket supported by the front suspension and steering system. The front drive sprocket is cranked by a reciprocating connecting rod. The handlebars turn the front wheel about a vertical axis to steer the bicycle, while concurrently it can also be pivotally moved forwardly and rearwardly. One end of the connecting rod is journaled to the pivotal handlebars such that pivotal motion thereof imparts reciprocal motion into the connecting rod to crank the drive sprocket which chain drives the front wheel. A biasing means is connected to engage the connecting rod at its extreme limits of travel whereupon the rod and drive sprocket are biased from its dead center position each 180° of rotation of the drive sprocket and is forced over-the-center so that the apparatus can be used in conjunction with a free-running clutch such as found on a ten-speed bicycle, for example.

11 Claims, 5 Drawing Figures

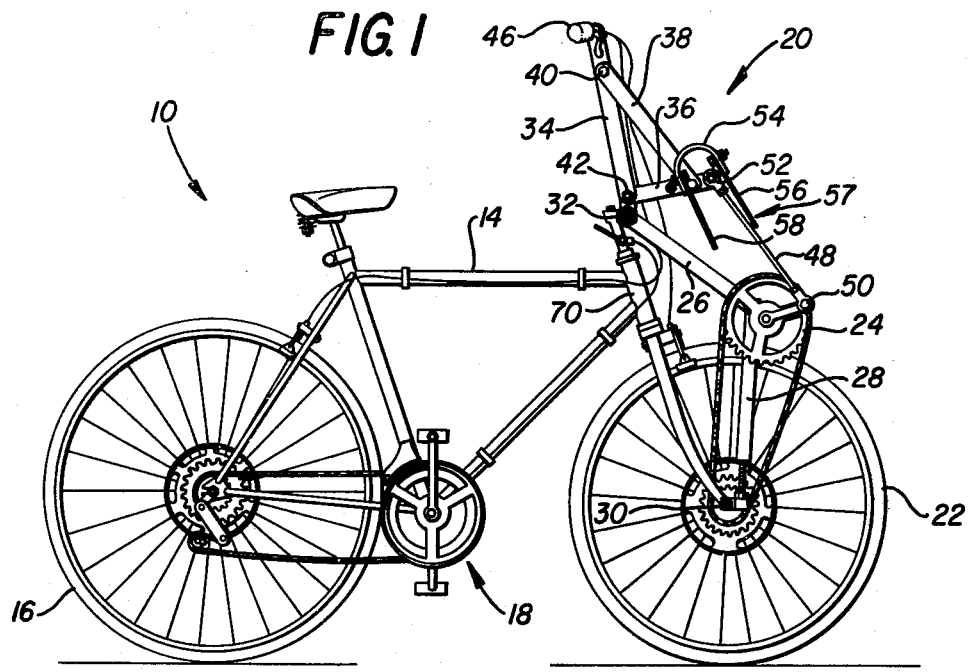
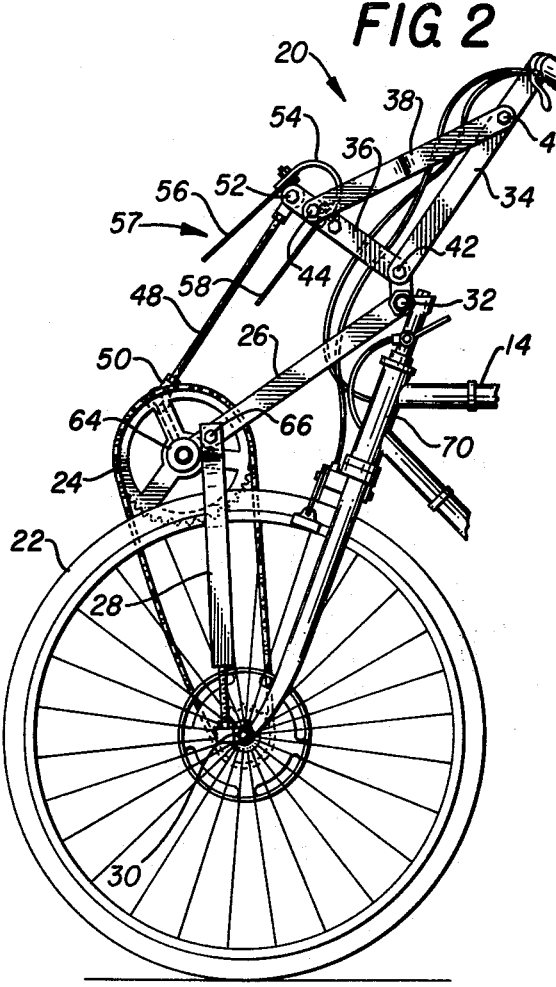
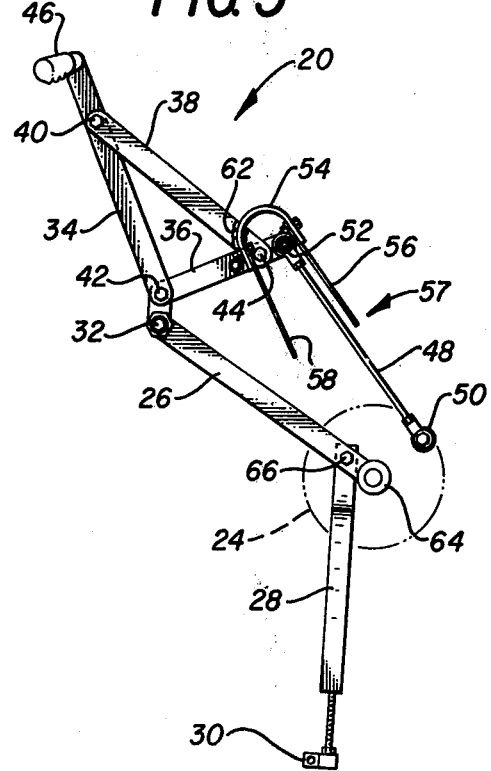

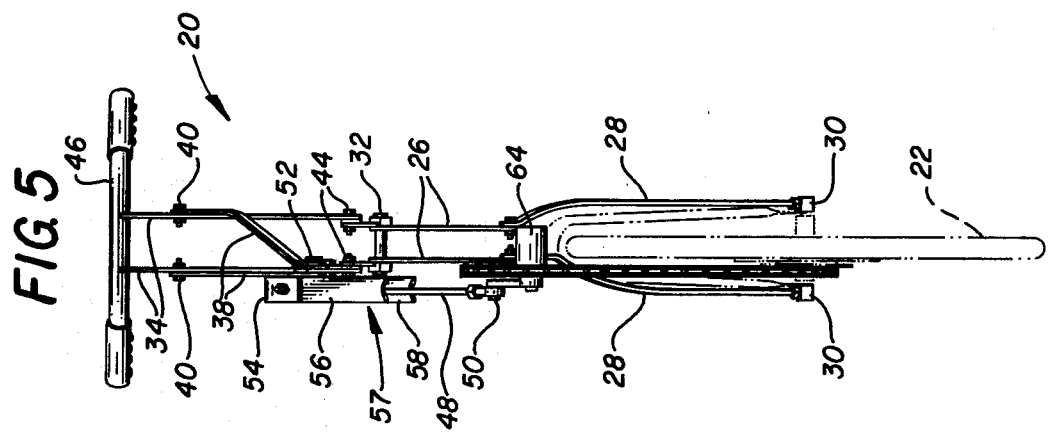
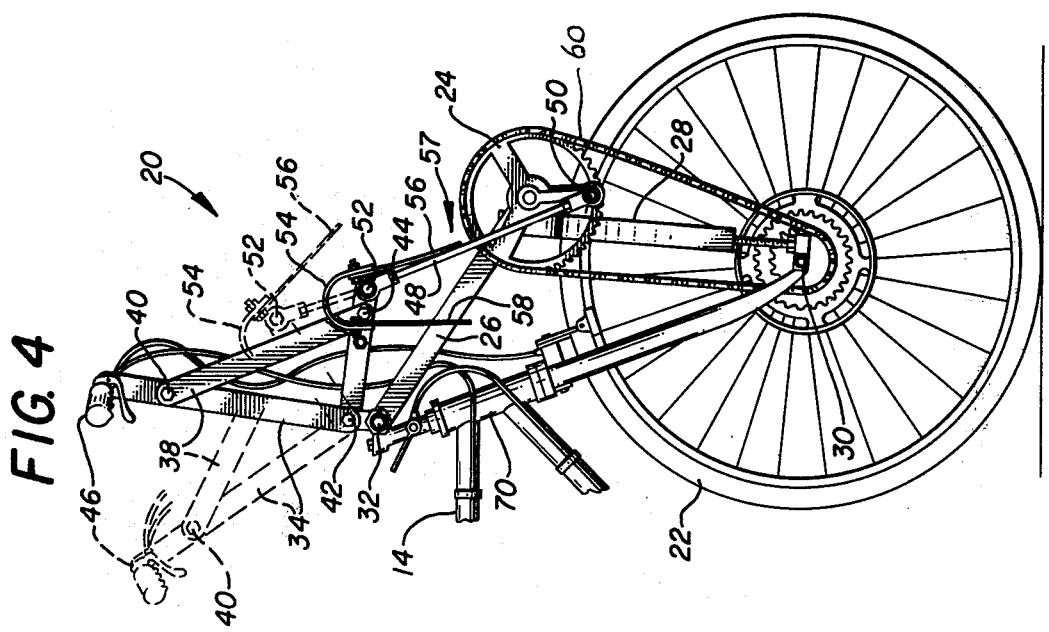

FRONT WHEEL DRIVE FOR A BICYCLE

RELATED PRIOR ART

| | |
|---|---|
| Clark | 3,701,543 |
| Woodruff | 626,427 |
| Huennekens | 498,394 |
| Murray | 565,556 |
| Williams | 634,537 |
| Hartley | 484,712 |
| Hendricks | 3,193,305 |
| Saxer | 2,547,600 |

The above mentioned prior art discloses various different front wheel drive apparatus for bicycles, wherein the handlebars are employed to induce torque into the front wheel by a pivotal action while concurrently enabling steering of the bicycle to be achieved by imparting rotational movement of the front wheel fork about a vertical axis thereof.

None of the above references disclose the employment of a crank driven front wheel sprocket wherein pivotal forward and rearward motion of the handlebars impart reciprocal movement into a connecting rod which in turn cranks the front sprocket, and with there being included a biasing means associated with the connecting rod which precludes the connecting rod and front sprocket coming to rest at either of the dead-center positions thereof.

BACKGROUND OF THE INVENTION

The handlebars and steering posts of bicycles must be made rugged for the reason that bicycle riders customarily exert a tremendous force thereon while pedaling in order to increase the cranking force imparted by their legs and feet into the main drive sprocket thereof. This force exerted into the handlebars represents wasted energy and it would be desirable to utilize this energy by employment of a crank system connected to chain drive the front wheel thereby achieving extra propulsion for the bicycle while requiring little or no additional effort on the part of the rider.

Others have proposed utilizing this wasted energy by pivotally connecting the handlebars to the steering system, thereby utilizing the pivotal motion to drive the front wheel of the bicycle.

The conversion of pivotal motion into rotational motion can be achieved by employment of a drive sprocket which is cranked by a connecting rod affixed to the handlebars, with the drive sprocket moving an endless chain connected to a driven sprocket affixed to the front wheel.

In the before described system, it is desirable to provide the driven sprocket with a one way or free-wheeling clutch assembly, thereby enabling the rider to discontinue and commence pivotal motion of the handlebars at any given time. This desirable feature, however, presents the problem of the crank and connecting rod failing to go over-the-center at the two dead-center positions of rotation, as well as sometimes causing crank reversal at each extreme length of travel of the connecting rod. Either of these situations is dangerous for the reason that when the crank is rotating to propel the bicycle in a forward direction, considerable resistance is encountered, according to the speed and power requirements of the bicycle, while hardly any resistance at all is encountered should the direction of rotation of the sprocket suddenly be reversed. Accordingly, while propelling a front wheel drive bicycle, should the crank reverse itself at either extreme limit of travel, the sudden removal of this resisting force can easily topple one from the bicycle causing potential injury to result. Therefore, it is desirable to have made available a biasing force which is placed on the connecting rod in such a manner that the rod is always biased at each extreme length of travel thereof to cause the crank to continue to turn in the appropriate direction to propel the bicycle in a forward direction.

SUMMARY OF THE INVENTION

A bicycle having a front and rear wheel drive assembly. The wheels support a main frame in such a manner that one's feet can pedal a crank sprocket which in turn drives a driven sprocket connected to the rear wheel by means of an endless chain. A handlebar assembly steers the front wheel assembly in the usual manner. According to the invention, the handlebars can additionally be pivotally moved in a forward and rearward direction in order to crank a forwardly located crank sprocket, which in turn chain drives the front wheel by means of a front driven sprocket attached thereto.

The forward crank sprocket is connected to the handlebars by means of a reciprocating connecting rod. Biasing means engage the connecting rod at the extreme limits of travel thereof in such a manner that the connecting rod is alternantly biased each reciprocation thereof to cause the sprocket to continue to rotate in the appropriate rotational direction as the connecting rod reaches dead-center and goes over-the-center respective to the crank sprocket.

In the preferred form of the invention, the biasing means is in the form of two spaced springs located on either side of the connecting rod and positioned such that one spring engages the connecting rod and biases the rod towards the other spring as the connecting rod approaches one of its extreme limits of travel, while the other spring comes in to connect with the connecting rod when the rod is moved to the other extreme limit of travel. This action prevents the crank sprocket from inadvertently coming to rest at the end of either stroke of the rod.

The front and rear wheel assemblies preferably are multispeed sprocket assemblies which include a one way clutch assembly such as found on the usual ten speed bicycle, for example.

Accordingly, a primary object of this invention is the provision of improvements in a front wheel drive assembly for a conventional bicycle.

Another object of the invention is the provision of apparatus by which a conventional bicycle can be modified by the incorporation of a front wheel drive assembly therewith.

A further object of this invention is the provision of an apparatus by which pivotal motion of bicycle handlebars impart reciprocal motion into a connecting rod, which in turn imparts rotational motion into a crank sprocket, which in turn chain drives a driven sprocket located on the front wheel of a bicycle.

A still further object of this invention is the provision of biasing means by which the power train of a front wheel drive of a bicycle is prevented from remaining on dead-center each 180° of rotation of the crank sprocket.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a side elevational view of a bicycle made in accordance with the present invention;

FIG. 2 is a fragmentary, side elevational view of the front of a bicycle having a front wheel drive assembly made in accordance with the present invention;

FIG. 3 is a side elevational view of apparatus made in accordance with the present invention;

FIG. 4 is similar to FIG. 2 and discloses the apparatus of the present invention in an alternate position; and, FIG. 5 is a front view of the apparatus disclosed in the foregoing figures.

DETAILED DESCRIPTION OF THE PREFERRED EMBODIMENT

FIG. 1 discloses a bicycle 10 having apparatus associated therewith made in accordance with the present invention. The bicycle includes a main frame 14 and a rear wheel assembly 16. The rear wheel assembly is rotated by a foot pedal actuated drive sprocket 18 in the usual manner.

In the various figures of the drawings, numeral 20 broadly indicates apparatus made in accordance with the present invention for imparting a driving force or torque into the front wheel 22 of the illustrated bicycle. As seen in FIGS. 2 and 4, a crank actuated front sprocket 24 has the journal thereof affixed to strut members 26 and 28. One end of member 28 is secured by the front axial bolt at numeral 30. One end of member 26 is secured to the handlebar attachment fitting as indicated by numeral 32. The other ends of members 26 and 28 are joined at 66. It will be noted that members 26 and 28, together with the front wheel fork assembly, cooperate together to jointly form a triangle.

As seen in FIGS. 1-5, the handlebars include members 34, 36, and 38 which have the ends thereof connected together to form a triangle. One apex of the triangle is journaled at 42 in spaced relationship to the fastener 32, although the journal 42 could be associated with the attachment point 32 should it be deemed desirable to do so. Numeral 46 indicates the handlebar grips located at another apex of the triangle.

Connecting rod 48 has a rod end bearing at each end thereof, with one end thereof being journaled to the crank sprocket, as indicated by the numeral 50, while the other end thereof is journaled to the remaining apex of the handlebar assembly as indicated by numeral 52.

Biasing means 57 preferably is in the form of two spaced apart leaf springs 56 and 58 which are connected to the U-shaped spacer 54. Spacer 54 is mounted in fixed relationship to the handlebar assembly and moves therewith in such a manner that pivotal motion of the handlebars bring alternate ones of the marginal ends of the springs into engagement with the connecting rod.

Endless front chain 60 forms part of the front drive assembly. The front drive sprocket is journaled at 64 to a front drive sprocket mount means located forwardly of the triangle formed by members 26 and 28.

Fastener 66 secures the forward ends of members 26 and 28 together and to the journal 64. Numeral 70 indicates the steering post housing by which the front forks are journaled for rotation of the front wheel assembly about a vertical axis so that the steerable front wheel can be steered by the handlebars.

In operation, the pivotally mounted handlebars are moved to reciprocate the connecting rod 48 between the resultant two extreme limits of travel, thereby rotating the crank sprocket. The crank sprocket accordingly reaches dead-center respective to the connecting rod each 180° of travel thereof. When the connecting rod is in either of its alternate positions, with the crank sprocket being located on dead-center, the handlebars resist being pivoted into the alternate position because the crank has no reason to go over-the-center in the absence of some compelling force such as momentum or the biasing means of this invention.

Where the driven sprocket is directly connected to the front wheel, the momentum of the bicycle will be effected through the drive train to carry the crank sprocket through this dead-center position; however, when a one way clutch assembly is employed between the driven sprocket and the front wheel, means must be provided by which the drive or crank sprocket is moved from this dead-center position.

Accordingly, biasing means 57 provides a biasing force which prevents the drive sprocket from remaining at the dead-center location while the front wheel drive is contributing to or providing all of the motive power. This is achieved by spacing springs 56 and 58 from one another and from the connecting rod when the drive sprocket is in the act of rotating between the two dead-center positions. The springs are located to contact the connecting rod with alternate ones of the springs as the drive sprocket is forced to travel over-the-center respective to its two dead-center positions which occurs during each 360° of rotation thereof.

As noted in FIG. 4, as the handlebars are pivoted forward and rearward, the location of the connecting rod respective to the springs is changed in such a manner that the marginal free end of one spring is brought to bear against one side of the rod, thereby biasing the rod as it approaches its dead-center position to cause a force to be effected upon the rod of a magnitude to force the crank sprocket over-the-center. During this time the other spring is spaced from the connecting rod in the illustrated manner of FIG. 3, for example.

As the drive sprocket approaches the other dead-center location, the marginal end of the other spring 58 bears against the opposed side of the connecting rod, thereby exerting a biasing force against the rod which biases the drive sprocket off dead-center as the drive sprocket rotates over-the-center.

The apparatus of the present invention can be assembled in the manner of FIG. 3 so that the combination of the present invention can be built up by using one's existing bicycle together with a rear wheel assembly and sprocket of a discarded bicycle.

The present invention enables one to exercise in a superior manner because his body is continually changing positions as he forces the handlebar assembly to move between the forward and rearward positions.

By the present invention, a free running or free wheeling assembly can be incorporated into the front wheel drive assembly since the troublesome and dangerous condition encountered when the front wheel assembly becomes locked in one of its dead-center locations has been eliminated.

I claim:

1. A bicycle having a main frame, a rear driven wheel assembly affixed to said frame; means by which said rear wheel assembly is rotated by a foot operated crank assembly; a forward front wheel, a front fork, said front wheel being rotatably mounted to a lower end of said front fork, an upper marginal end of said front fork is journaled to said main frame for steering the bicycle;

handlebar means pivotally mounted to an upper end of said front fork and arranged for steering the bicycle, while at the same time said handlebar means can be pivotally moved forward and rearward;

a drive sprocket means mounted in journaled relationship to said front fork for rotating said front wheel, a driven sprocket connected to said front wheel, an endless chain connecting said drive and said driven sprockets together; a connecting rod connected between said handlebar means and said drive sprocket means for cranking said drive sprocket means in response to pivotal forward and rearward movement of said handlebar means;

biasing means, including a spring, for biasing said connecting rod at each extreme limit of travel thereof to provide a biasing force which moves the connecting rod off-center respective to said drive sprocket each 180° rotation thereof.

2. The bicycle of claim 1 wherein said biasing means includes spaced spring members positioned on opposed sides of said connecting rod and arranged to contact said rod as the rod approaches and passes through each extreme limit of travel thereof.

3. The bicycle of claim 1 wherein said spring member includes two spaced springs mounted in fixed relation respective to said handlebar means, and arranged such that forward motion of the handlebar means brings one said spring into contact with said connecting rod as the rod approaches its extreme length of travel, with the last said spring remaining in contact with the rod until the rod has reversed its direction of travel, and thereafter the other spring similarly contacts the rod as the handlebar means is moved towards the extreme rearward position.

4. The bicycle of claim 1 wherein said front and rear wheels are multi-speed assemblies having means for selectively changing the ratio of the drive and driven sprockets.

5. The bicycle of claim 1 wherein the front drive sprocket is rotatably supported in a journal which is mounted in fixed relation relative to said fork, said front drive sprocket being positioned forward of said main frame, above said driven sprocket, and below the pivotal connection of said handlebar means.

6. The bicycle of claim 1 wherein said biasing means includes spaced spring members positioned on opposed sides of said connecting rod and arranged to contact said connecting rod as the connecting rod approaches and passes through each of its extreme limits of travel; said biasing means is two spaced leaf springs each having a fixed and an attached end with the attached end being supported by said handlebar means; each of said leaf springs having a free end extending in the same general direction as said connecting rod; each of said leaf springs being positioned respective to the other and to the connecting rod such that when the handlebar is in the extreme forward position one of said leaf springs contacts and biases the rod over-the-center respective to its dead-center position, while the remaining one of said leaf springs is spaced from the rod, and when the handlebar is in the extreme rear position, the other of said leaf springs is in contact with the rod and biases the rod over-the-center and away from its dead-center position.

7. In a vehicle having a main frame, a rear wheel assembly, a foot crank means by which rotational motion is imparted into the rear wheel assembly;

a front wheel assembly including a fork connected to a steering post at the forward end of the frame;

means forming pivotally mounted handlebars which pivot in a forward and a rearward direction while concurrently rotating about another axis for imparting a steering motion into the front wheel; the improvement comprising:

a drive sprocket journaled to said fork, a driven sprocket connected to said front wheel; means, including an endless chain, by which said drive sprocket rotates said driven sprocket; a crank on said drive sprocket, a connecting rod having one end connected to be moved by said handlebars and the other end connected to said crank so that pivotal movement of said handlebars in a forward and a rearward direction reciprocates said connecting rod which rotates said drive sprocket;

biasing means by which said connecting rod is biased over-the-center position thereof with respect to said drive sprocket as the connecting rod reaches either of its two extreme positions of reciprocal movement.

8. The vehicle of claim 7 wherein said biasing means includes two spaced springs having one end thereof mounted in fixed relation respective to said handlebars and arranged such that forward motion of the handlebars brings one spring into contact with the connecting rod as the rod approaches its extreme length of travel with the spring remaining in contact with the rod until the rod has reversed its path of travel, and thereafter the other spring similarly contacts the rod as the handlebars move the rod towards the other extreme position of travel.

9. The vehicle of claim 7 wherein said front and rear wheel assemblies are multi-speed assemblies, means by which the ratio between the drive and driven sprockets can be selectively changed.

10. The vehicle of claim 7 wherein said biasing means include spaced spring members positioned on opposed sides of said connecting rod and arranged to contact said rod as the connecting rod approaches and passes through each extreme limit of travel.

11. A self-propelled vehicle having a main frame, a rear wheel assembly affixed to said frame; a front wheel, a front wheel suspension means, said front wheel being rotatably mounted to a lower end of said front wheel suspension means;

steering means pivotally mounted to the upper end of said wheel suspension means, said steering means being arranged for steering the vehicle while at the same time said steering means can be pivotally moved forward and rearward;

a drive sprocket mounted to said front suspension means for rotating said front wheel, a driven sprocket connected to said front wheel, an endless chain connecting said drive and said driven sprockets together; a connecting rod connected between said steering means and drive sprocket for cranking said drive sprocket in response to pivotal movement of said steering means;

biasing means, including a spring, for biasing said connecting rod at each extreme limit of travel to provide a biasing force which moves the connecting rod off-center respective to said drive sprocket each 180° rotation thereof.

* * * * *